(12) United States Patent
Chen et al.

(10) Patent No.: US 6,940,202 B1
(45) Date of Patent: Sep. 6, 2005

(54) ELECTRICAL MACHINE HAVING A STATOR WINDING WITH A PLURALITY OF FILARS

(75) Inventors: Hanyang Ben Chen, Ypsilanti, MI (US); Kirk E. Neet, Saline, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/848,908

(22) Filed: May 19, 2004

(51) Int. Cl.$^7$ ................................. H02K 3/28
(52) U.S. Cl. ....................... 310/184; 310/180
(58) Field of Search ................. 310/179, 180, 310/184, 207–208

(56) References Cited

U.S. PATENT DOCUMENTS

| | | | |
|---|---|---|---|
| 3,753,060 A | 8/1973 | Greenwell | |
| 3,753,062 A | 8/1973 | Greenwell | |
| 3,780,324 A | 12/1973 | Greenwell | |
| 3,838,322 A | 9/1974 | Greenwell | |
| 3,854,077 A | 12/1974 | Greenwell | |
| 4,675,591 A * | 6/1987 | Pleiss | 318/773 |
| 4,808,868 A | 2/1989 | Roberts | |
| 4,896,063 A | 1/1990 | Roberts | |
| 4,959,573 A | 9/1990 | Roberts | |
| 5,231,324 A | 7/1993 | Kawamura et al. | |
| 5,691,590 A * | 11/1997 | Kawai et al. | 310/180 |
| 6,417,592 B2 * | 7/2002 | Nakamura et al. | 310/184 |
| 6,455,971 B1 * | 9/2002 | Palma et al. | 310/180 |
| 6,552,463 B2 * | 4/2003 | Oohashi et al. | 310/207 |
| 6,570,289 B1 | 5/2003 | Liang et al. | |
| 6,833,648 B2 * | 12/2004 | Gorohata et al. | 310/180 |
| 2002/0033646 A1 | 3/2002 | Tanaka et al. | |
| 2003/0137207 A1 | 7/2003 | Tamura et al. | |
| 2003/0173860 A1 | 9/2003 | Even | |
| 2003/0193253 A1 | 10/2003 | Arimitsu et al. | |

FOREIGN PATENT DOCUMENTS

| | | | | |
|---|---|---|---|---|
| JP | 54085309 A | * | 7/1979 | H02K 3/28 |
| JP | 2002119001 A | * | 4/2005 | H02K 3/28 |
| JP | 2001197696 A | * | 7/2005 | H02K 3/28 |
| JP | 2002199640 A | * | 7/2005 | H02K 3/28 |

\* cited by examiner

Primary Examiner—Burton Mullins
(74) Attorney, Agent, or Firm—Brinks Hofer Gilson & Lione

(57) ABSTRACT

A stator for an electric machine includes a generally cylindrically-shaped stator core having a plurality of circumferentially spaced core slots. A stator winding includes a plurality of phases, each including a plurality of filars, each filar extending circumferentially around the stator core to form a plurality of layers. Each of the filars is a conductor having a plurality of substantially straight segments disposed in the core slots. The straight segments are alternately connected at the first and second ends of the stator core by a plurality of end loop segments. The filars of a particular phase each have an average radial position within the stator core, and are staggered throughout the layers such that a distance between the average radial position of each filar and the average radial position of the other filars is minimized.

34 Claims, 11 Drawing Sheets

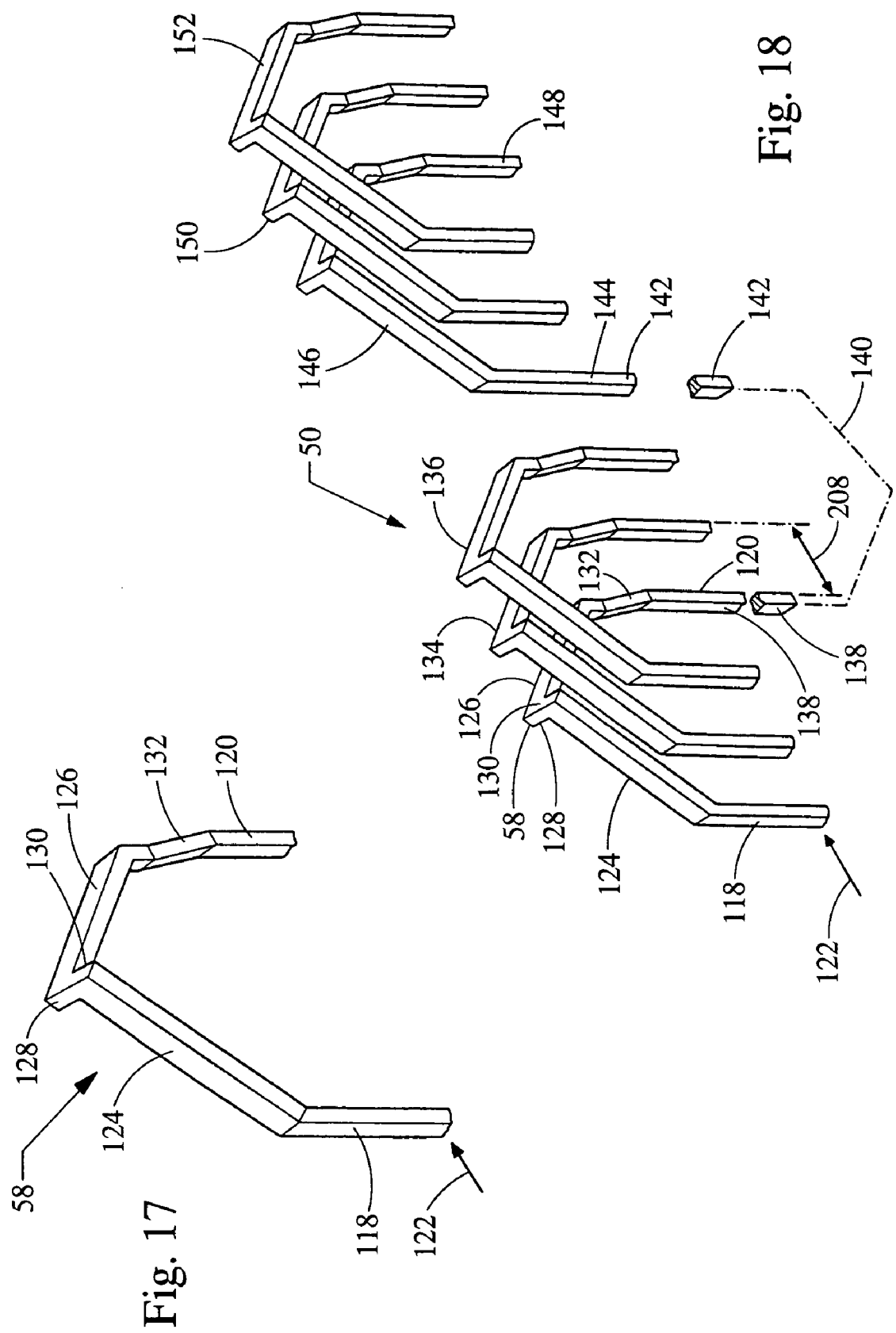

ELECTRICAL MACHINE HAVING A STATOR WINDING WITH A PLURALITY OF FILARS

BACKGROUND OF THE INVENTION

The present invention relates generally to electric machines and, in particular, to a stator winding for an electric machine having a plurality of filars with reduced cross current circulation. Electric machines, such as alternating current electric generators, or alternators are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a rotor attached to a generally cylindrical shaft that is rotatably mounted in the housing and is coaxial with the stator assembly. The stator assembly includes a plurality of wires wound thereon, forming windings. The stator windings are formed of straight portions that are located in the slots and end loop sections that connect two adjacent straight portions of each phase and are formed in a predetermined multi-phase (e.g. three or six) winding pattern in the slots of the stator core. The rotor assembly can be any type of rotor assembly, such as a "claw-pole" rotor assembly, which typically includes opposed poles as part of claw fingers that are positioned around an electrically charged rotor coil. The rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings in a well known manner. The alternating electrical current is then routed from the alternator to a distribution system for consumption by electrical devices or, in the case of an automotive alternator, to a rectifier and then to a charging system for an automobile battery.

One type of device is a high slot fill stator, which is characterized by rectangular shaped conductors that are aligned in at least one radial row in each slot and whose width, including any insulation, fits closely to the width of the rectangular shaped core slots, including any insulation. It is obvious to those skilled in the art that the term rectangular shaped core slot may include a rectangular shape with radii at the corners and/or include a specially shaped slot opening at the inner surface.

High slot fill stators are advantageous because they have less heat dissipation with lower electrical resistance and help produce more electrical power per winding than other types of prior art stators. These stators, however, are disadvantageous because the windings are typically interlaced, in which the wires are required to alternate outer and inner radial portions of each slot. This is because one end loop connects the straight segment housed in an outer radial depth of the first slot to a straight segment housed in an inner radial depth of the second slot. This conductor leaves a void in the outer radial depth of the second slot, therefore a second conductor must connect the straight segment housed in an outer radial depth of the second slot to a straight segment housed in an inner radial depth of the third slot. These interlaced windings require an interlacing process to interlace the conductors of all the phases prior to inserting the winding into the core or a connection process to connect the individual U-shaped conductors and therefore disadvantageously increase the complexity of placing the winding the stator.

In a bi-filar winding stator each phase turn includes two wires or filars, which are connected in parallel. The wire cross section in a bi-filar design, having a certain electrical resistance, is substantially half of that in a single-filar design, having substantially the same electrical resistance. Therefore, wires in bi-filar designs are much more structurally flexible for bending and turning at stator winding end turns. However, bi-filar windings may be subject to overheating due to cross current circulation between filars. Cross current circulation can occur when the two filars are linked by a different amount of flux and therefore have different generated voltages. This can occur if the straight segments of the first filar have a different average radial position in the core slots than the straight segments of the second filar and a phenomenon known as magnetic flux slot leakage, is present.

The "normal" path of the magnetic flux is to encircle completely around a core slot by traveling radial outward down one tooth, circumferentially across the yoke and finally radially inward down another tooth. This path for the magnetic flux encircles and therefore links all of the straight segments located in the encircled core slot. However, some amount of the magnetic flux short circuits this path by prematurely crossing the slot before it reaches the yoke—this portion of the magnetic flux is known as slot leakage flux. This slot leakage flux only encircles, and therefore links, straight segments that are located radially inward of the radial position where it pre-maturely crosses the slot. Therefore, slot leakage flux can cause filars with different average radial positions in a slot to have different generated voltages and therefore cross current circulation. This over-heating and cross current circulation reduces the efficiency of the alternator.

In addition, the cross circuit circulation problem is magnified for high slot fill stators whose typical circumferential core slot width, such as less than 2.6 mm, is narrower than the typical stator core slot width. This is true because magnetic flux prefers to follow the path of least resistance, which is normally along the path of magnetic permeable material as previously mentioned as the "normal" path. However, depending on the magnetic reluctance of the path across a core slot, some amount of magnetic flux prematurely crosses the core slot. The width of a non-permeable material, such as the air, copper wire and insulator, found in a core slot increases the magnetic reluctance to allow magnetic flux to flow. Therefore, the circumferentially narrower the core slot, the larger the amount of flux leakage and the larger the amount of cross circuit circulation.

Recent stator innovations have increased the number of phases in a stator from three phases to a larger number of phases, such as six. A stator having a higher number of phases consequently magnifies the cross circuit circulation problem because the stator has a higher number of core slots located in a core having a similar circumference distance and therefore the circumferential width of each core slot is typically narrower.

It is desirable, therefore, to provide a stator that utilizes a bi-filar design while reducing the amount of cross current circulation between filars.

SUMMARY OF THE INVENTION

A stator for a dynamoelectric machine according to the present invention includes a generally cylindrically-shaped stator core having a plurality of circumferentially spaced and axially-extending core slots in a surface thereof. The core slots extend between a first and a second end of the stator core. The stator also includes a multi-phase stator winding, wherein each phase includes a first filar and a second filar extending circumferentially around the stator core to form a plurality of layers. The term layer, utilized herein, refers to the portion of a conductor that extends circumferentially around the core alternating end loop segments with substantially straight segments and having each straight segment located the substantially same radial distance from the central axis of the stator core. Although the layers are shown as completing a circumference around a stator core, it may be desirable for a layer or layers to stop prior to completing a full circumference. Therefore, the term layer, utilized herein, refers to a portion of a conductor that extends for at least a majority of a circumference around the stator core.

Each of the filars is a conductor having a plurality of substantially straight segments disposed in the core slots and may be formed from a single continuous conductor. The straight segments alternately connected at said first and second ends of said stator core by a plurality of end loop segments. Each of the straight segments of a particular layer is located in a substantially same radial distance from a central axis of the stator core and the end loop segments may form a cascaded winding pattern. The cascaded winding pattern is described in more detail in U.S. patent application Ser. No. 10/443,441 which was filed on May 22, 2003 and is hereby incorporated by reference into this application.

The first and second filars of a particular phase each have an average radial position within the stator core slots. The first and second filars of each phase are staggered throughout the layers such that a distance between the average radial position of the straight segments of the first filar and the average radial position of the straight segments of the second filar is minimized.

The cascaded winding pattern in does not require the complex interlaced winding process or the hairpin conductors of the prior art. The stator winding is cascaded and not interlaced because each of the straight segments of each layer are located at the same radial distance from the central axis of the stator core and, therefore, do not alternate rearward and forward positions in the slot with other conductors. In addition, the stator winding is cascaded and not interlaced because the end loop segments are formed such that the conductors are radially aligned for each layer, i.e. the first layer always lays radially outward of the second layer, which always lays radially outward of the third layer and so forth. Finally, the stator winding is cascaded and not interlaced because for each layer the phases can be sequentially inserted into the core from the inner diameter, i.e. the first phase of the first layer can be inserted into the core before the second phase of the first layer is inserted into the core which can be inserted into the core before the third phase of the first layer and so forth.

Also, the staggered pattern of the first and second filars of each phase reduces the amount of cross current circulation between the first and second filars. This reduces the amount of heat generation within the stator, thereby making the stator more efficient.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 17 is a perspective view of an end loop segment of a portion of a stator winding in accordance with the present invention;

FIG. 18 is a perspective view of a layer of end loop segments of a portion of a stator winding in accordance with the present invention including the end loop segment of FIG. 17;

DESCRIPTION OF THE EMBODIMENTS

Figure 1:
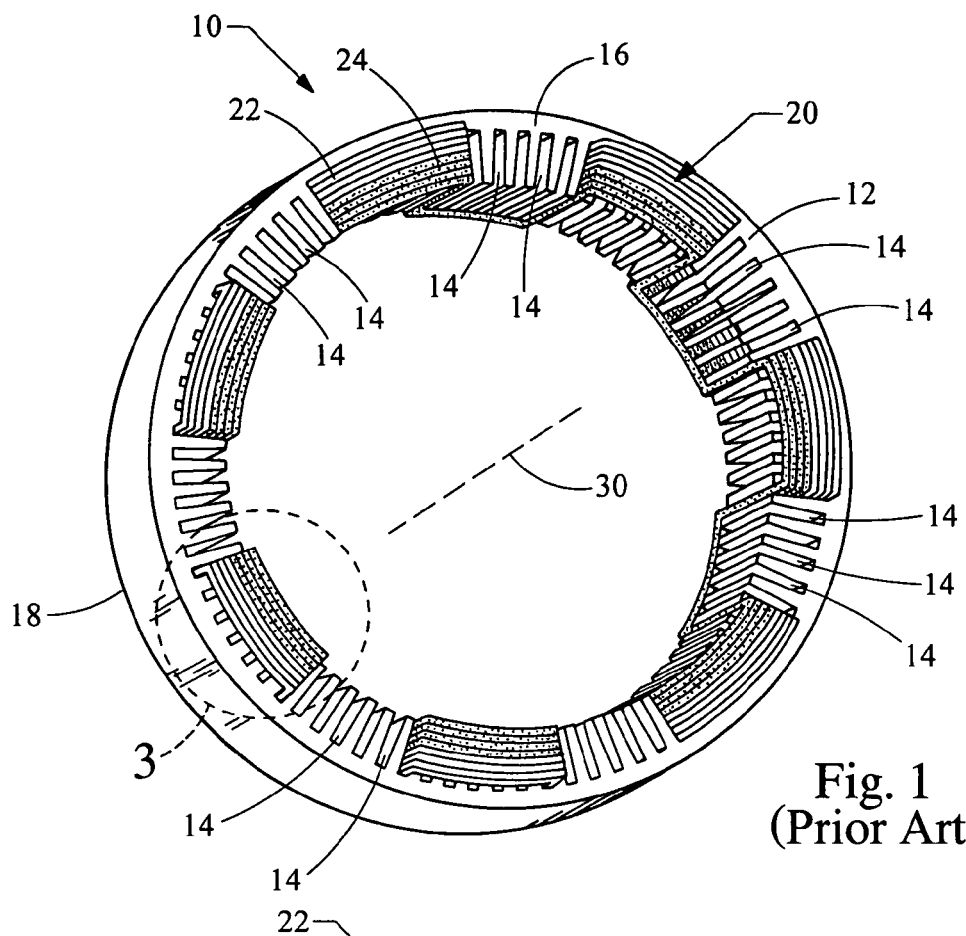
FIG. 1 is a perspective view of a prior art stator core including a single phase of the winding.
Figure 2:
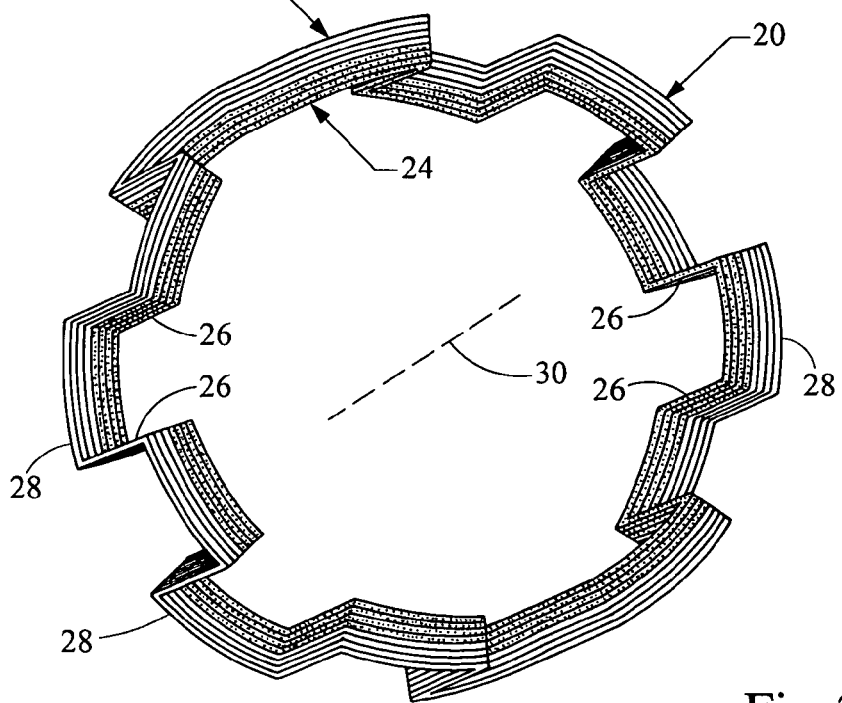
FIG. 2 is a perspective view of the winding from FIG. 1.
Figure 3:
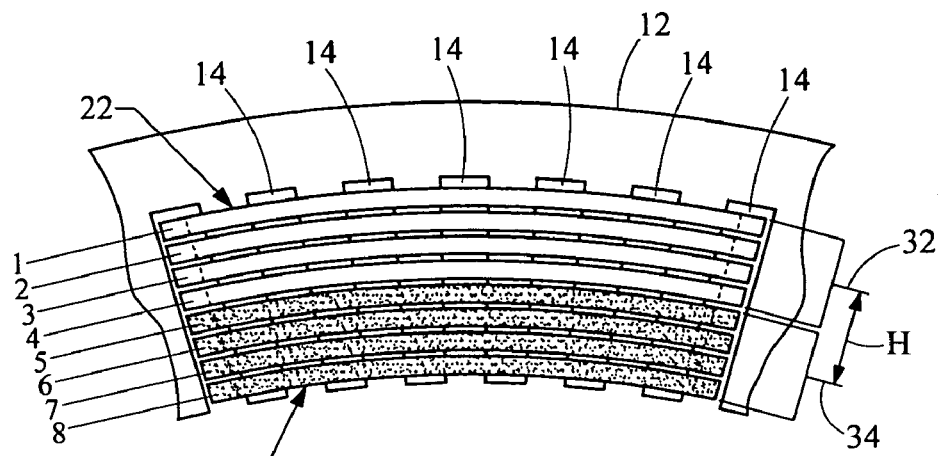
FIG. 3 is an enlarged view of a portion of FIG. 1 as indicated by the circle labeled "FIG. 3" in FIG. 1.

Referring now to FIGS. 1–3, a prior art stator is shown generally at 10. The stator 10 includes a generally cylindrically-shaped stator core 12 having a plurality of circumferentially spaced and axially-extending core slots 14. The core slots 14 define a plurality of teeth 15 there between, which are connected to one another by a yoke 19. The core slots 14 extend between a first end 16 of the stator core 12 and a second end 18 of the stator core 12. The stator core 12 includes a stator winding 20 having a plurality of phases (for simplicity, FIGS. 1–13 of stator winding 20 depict only one phase and do not show necessary end loop shapes that allow nesting of the end loops of all the phases, such as the cascade winding shown in FIGS. 17, 18, 19a and 19b). Each phase of the stator winding 20 comprises a first filar 22 and a second filar 24. As shown in FIGS. 1–3, as well as in FIGS. 4–13, the second filar 24 is indicated by stipple hatching. The first and second filars 22, 24 extend around the stator core 12 circumferentially to form a plurality of layers having straight segments located at the substantially same radial distance from the central axis of the stator core. FIG. 1 shows a stator core 12 with one phase of a winding 20 included therein. FIG. 2 shows the winding 20 removed from the stator core 12. In this prior art stator 10, the first filar 22 is wound onto the stator core 12, filling in the first four layers of the stator core 12 and the second filar 24 is wound onto the stator core 12 filling the next four layers of the stator core 12, as shown in FIG. 3.

Each of the first and second filars 22, 24 may be a single continuous conductor having a plurality of substantially straight segments 26 disposed in the core slots 14. The straight segments 26 are alternately connected at the first and second ends 16, 18 of the stator core 12 by a plurality of end loop segments 28. Each of the straight segments 26 of a particular layer are substantially the same radial distance from a central axis 30 of the stator core 12 and the end loop segments 28 may form a cascaded winding pattern.

The first filar 22 of a particular phase defines a first average radial position 32 within the stator core 12 and the second filar 24 of a particular phase defines a second average radial position 34 within the stator core 12. As shown in FIG. 3, in prior art alternators of this type, there is a significant difference between the average radial position 32 of the first filar 22 and the average radial position 34 of the second filar 24, as indicated by reference letter H. This difference causes cross current circulation between the first and second filars 22, 24, which reduces the efficiency of the alternator.

Figure 6:
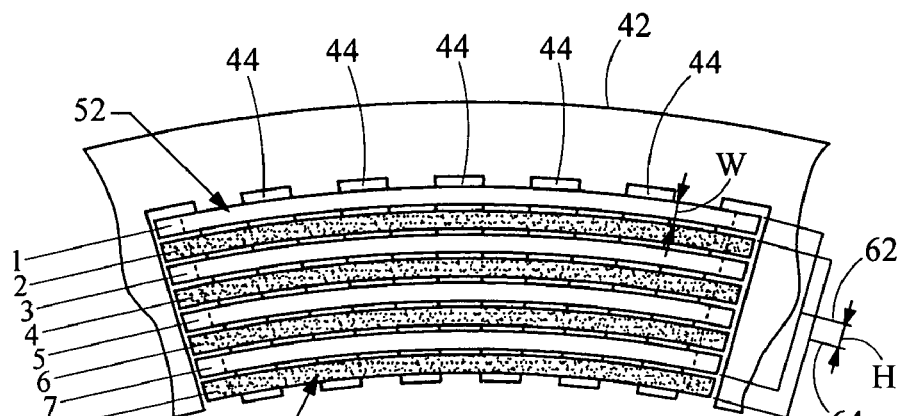
FIG. 6 is an enlarged view of a portion of FIG. 1 as indicated by the circle labeled "FIG. 6" in FIG. 4.
Figure 4:
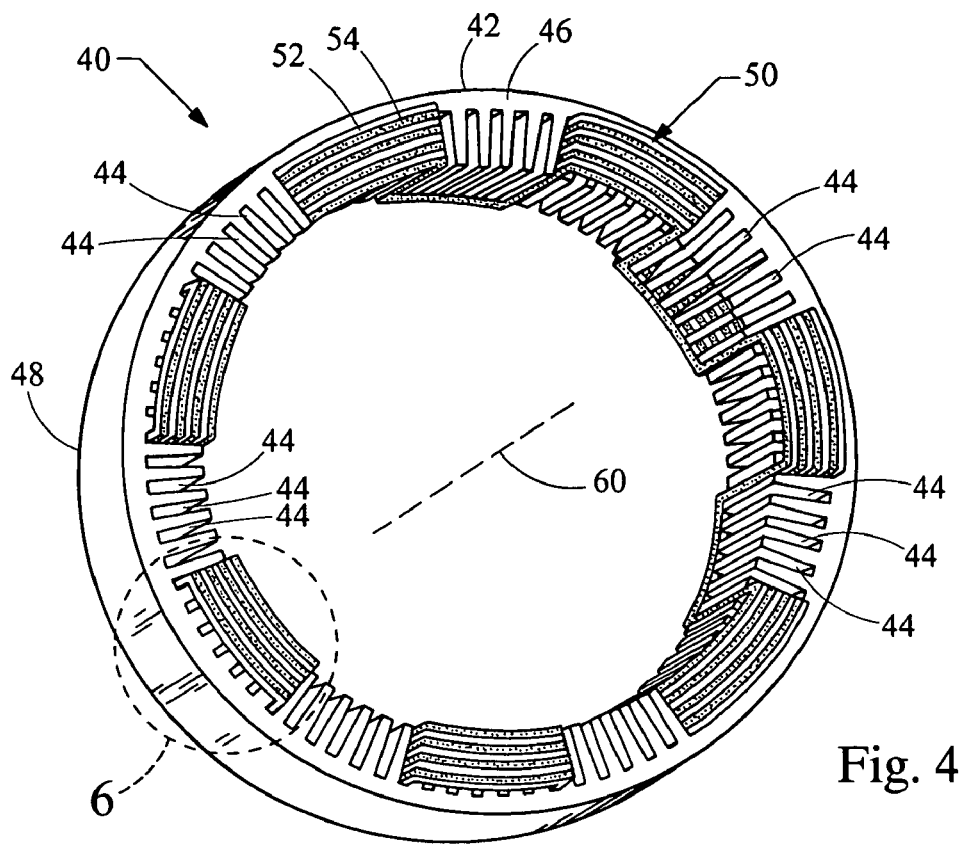
FIG. 4 is a perspective view of a stator core in accordance with the present invention including a single phase of the winding.
Figure 5:
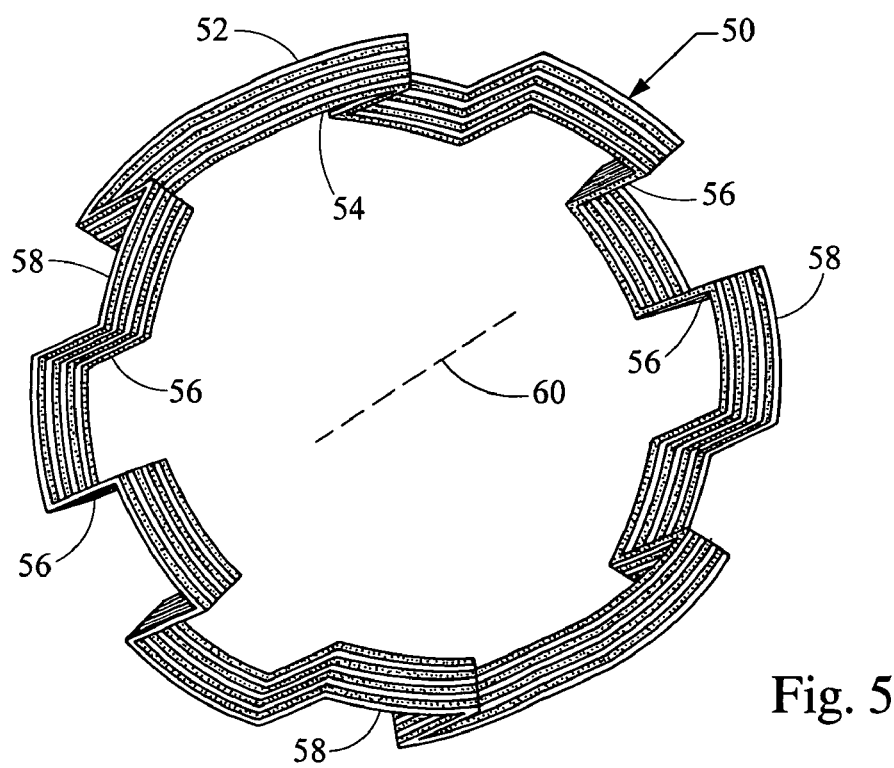
FIG. 5 is a perspective view of the winding from FIG. 4.

Referring now to FIGS. 4–6, a stator of the present invention is shown generally at 40. The stator 40 includes a generally cylindrically-shaped stator core 42 having a plurality of circumferentially spaced and axially-extending core slots 44. The core slots 44 extend between a first end 46 of the stator core 42 and a second end 48 of the stator core 42. The stator core 42 includes a stator winding 50 having a plurality of phases (for simplicity, FIGS. 1–13 of stator winding 20 depict only one phase). Each phase of the stator winding 50 comprises a first filar 52 and a second filar 54. The first and second filars 52, 54 extend around the stator core 42 circumferentially to form a plurality of layers. FIG. 5 shows the winding 50 removed from the stator core 42. The first filar 52 and the second filar 54 are wound onto the stator core 42.

Each of the first and second filars 52, 54 may be a single continuous conductor having a plurality of substantially straight segments 56 disposed in the core slots 44. The straight segments 56 are alternately connected at the first and second ends 46, 48 of the stator core 42 by a plurality of end loop segments 58. Each of the straight segments 56 of a particular layer are substantially the same radial distance from a central axis 60 of the stator core 42.

The first filar 52 of a particular phase defines a first average radial position 62 within the stator core 42 and the second filar 54 of a particular phase defines a second average radial position 64 within the stator core 42. As shown in FIG. 6, the first and second filars 52, 54 of each phase are staggered throughout the layers such that the distance, H, between the first average radial position 62 of the first filar 52 and the second average radial position 64 of the second filar 54 is minimized.

FIGS. 4, 5, and 6 show a winding pattern for an eight layer winding 50 wherein the first filar 52 occupies layers 1, 3, 5, and 7 of the stator core 42 and the second filar 54 occupies layers 2, 4, 6, and 8 of the stator core 42. A winding 50 having any number of layers, is considered as being staggered in an alternating pattern when a first filar 52 alternates layers with a second filar 54 in the radial direction, such as the winding 50 seen in FIGS. 4, 5 and 6. It is preferable that the distance, H, between the first average radial position 62 and the second average radial position 64 is less than 1.75 times the radial width, W, of either one of the filars 52, 54.

Figure 7:
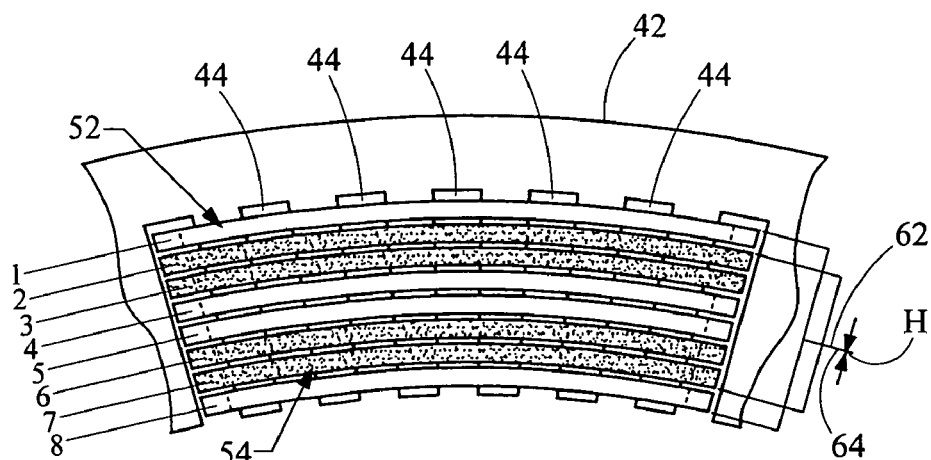
FIGS. 7–13 are views similar to FIG. 6 illustrating different configurations for two wires of one phase of the stator.
Figure 8:
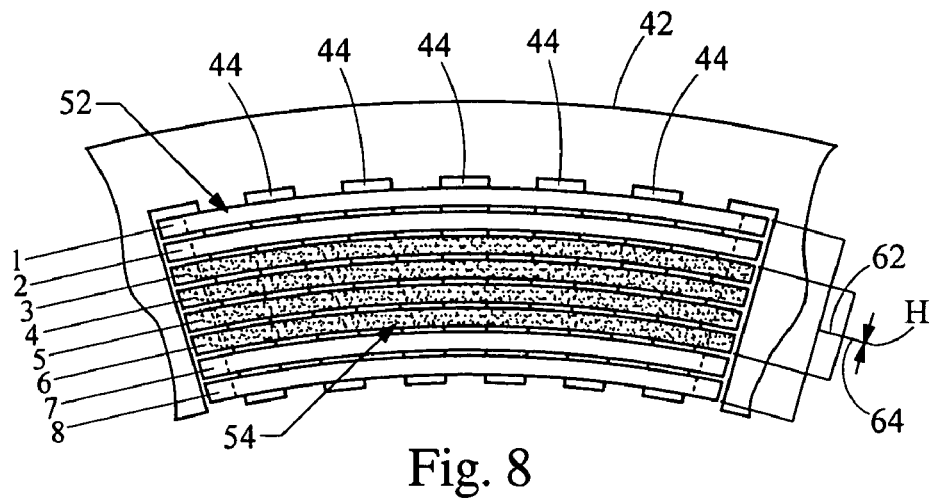
Figure 9:
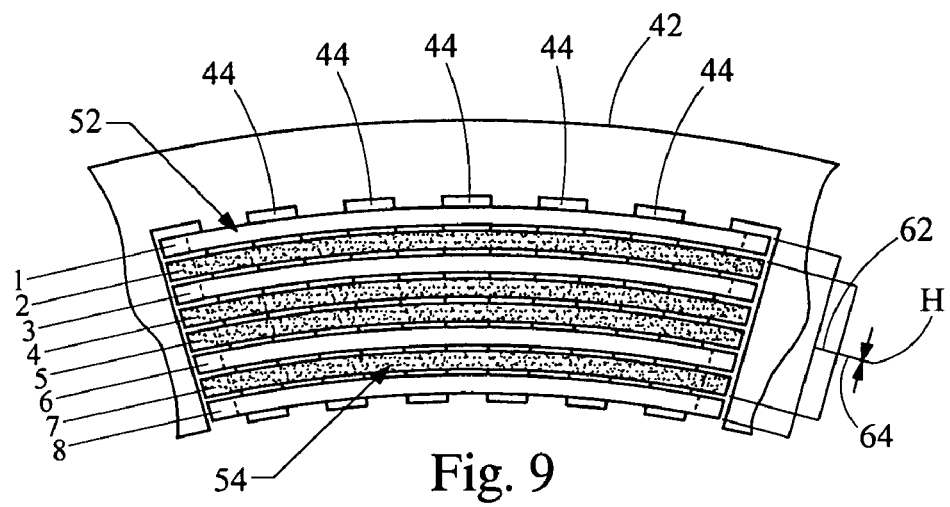
Figure 10:
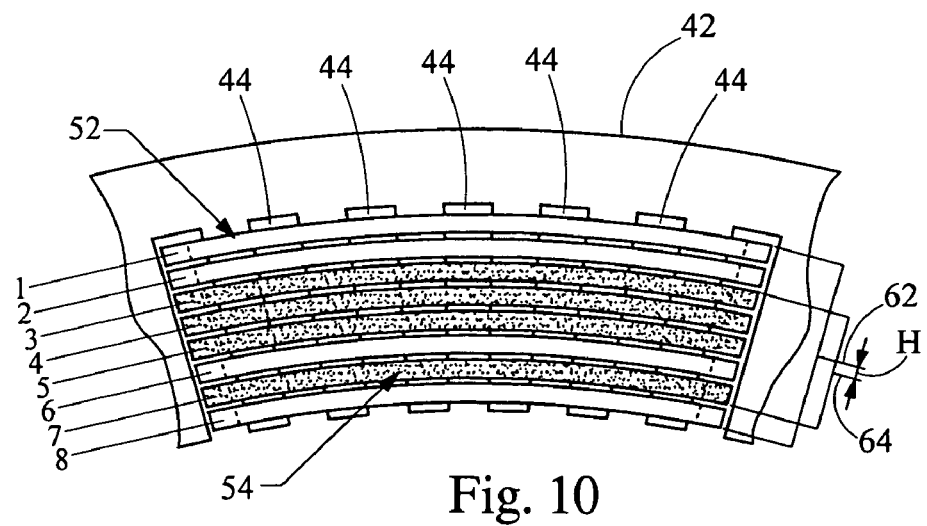
Figure 11:
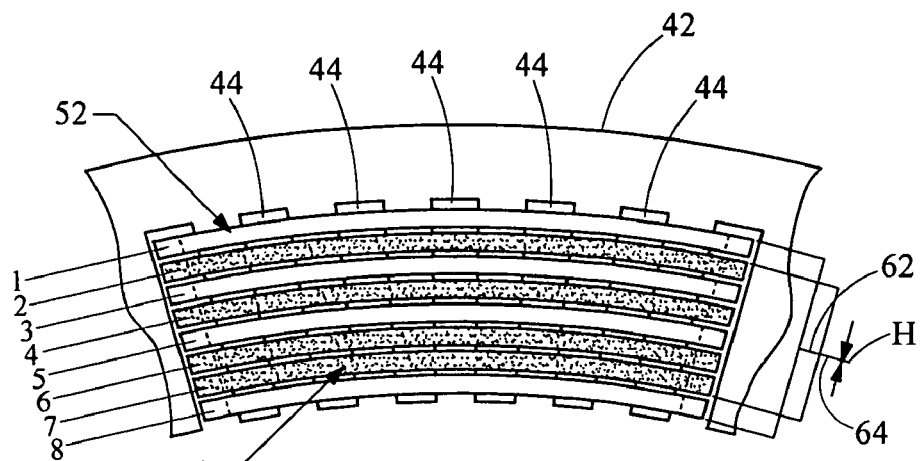
Figure 12:
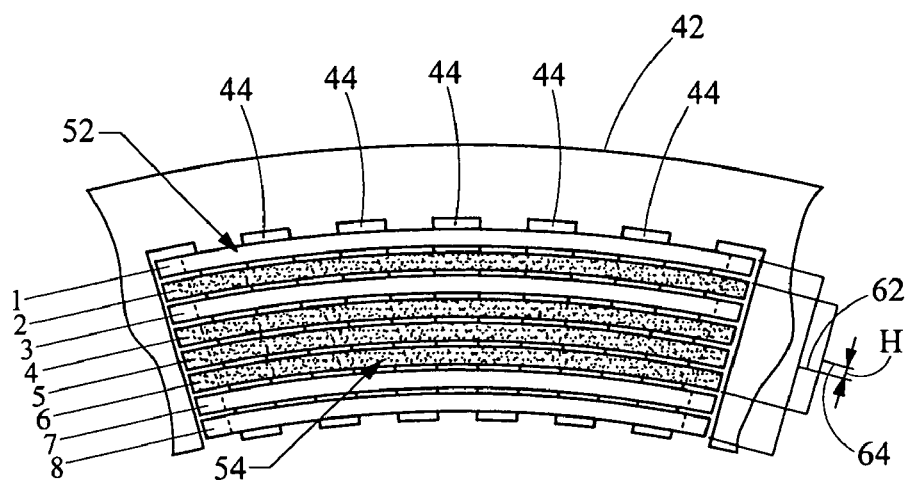
Figure 13:
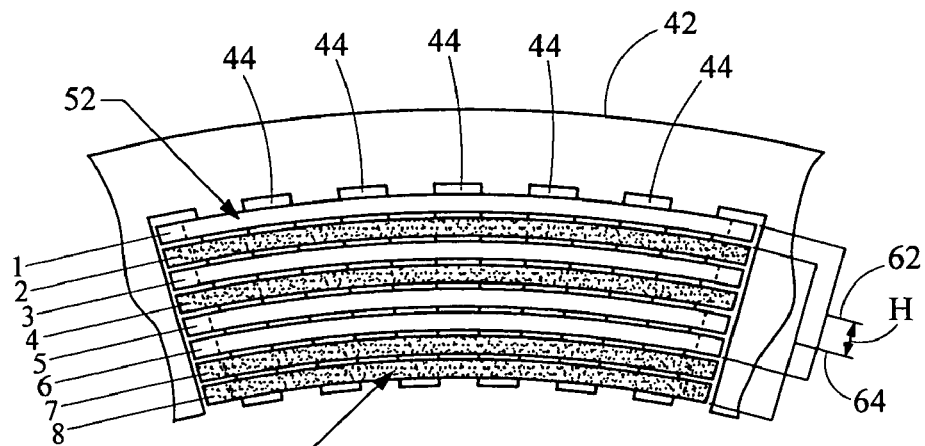

FIGS. 7–13 illustrate seven other staggering patterns that result in a distance, H, that is less than 1.75 W. FIG. 7, illustrates a stator 10 wherein the first filar 52 and the second filar 54 are staggered such that the first filar 52 occupies layers 1, 4, 5, and 8 and the second filar 54 occupies layers 2, 3, 6, and 7. FIG. 8, illustrates a stator 10 wherein the first filar 52 and the second filar 54 are staggered such that the first filar 52 occupies layers 1, 2, 7, and 8 and the second filar 54 occupies layers 3, 4, 5, and 6. FIG. 9, illustrates a stator 10 wherein the first filar 52 and the second filar 54 are staggered such that the first filar 52 occupies layers 1, 3, 6, and 8 and the second filar 54 occupies layers 2, 4, 5, and 7. FIG. 10, illustrates a stator 10 wherein the first filar 52 and the second filar 54 are staggered such that the first filar 52 occupies layers 1, 2, 6, and 8 and the second filar 54 occupies layers 3, 4, 5, and 7. FIG. 11, illustrates a stator 10 wherein the first filar 52 and the second filar 54 are staggered such that the first filar 52 occupies layers 1, 3, 5, and 8 and the second filar 54 occupies layers 2, 4, 6, and 7. FIG. 12, illustrates a stator 10 wherein the first filar 52 and the second filar 54 are staggered such that the first filar 52 occupies layers 1, 3, 7, and 8 and the second filar 54 occupies layers 2, 4, 5, and 6. FIG. 13, illustrates a stator 10 wherein the first filar 52 and the second filar 54 are staggered such that the first filar 52 occupies layers 1, 3, 5, and 6 and the second filar 54 occupies layers 2, 4, 7, and 8. The winding pattern of FIGS. 7–13 are therefore staggered not in the alternating pattern, but in a staggered pattern which includes at least one pair of radial adjacent layers comprised of the same filar, i.e. layer 6 and layer 7 of FIG. 11 are radially adjacent and comprised of the same filar 54.

In one embodiment of the present invention, the first filar 52 and the second filar 54 of each phase each include a first end 66 and a second end 68. The first ends 66 of the first and second filars 52, 54 are connected to one another and the second ends 68 of the first and second filars 52, 54 are connected to one another such that the first and second filars 52, 54 of each phase are connected in parallel. The first ends 66 of the first and second filars 52, 54 of each phase are connected to a neutral point and said second ends 68 of said first and second filars 52, 54 of each phase are connected to a rectifier.

Figure 14:
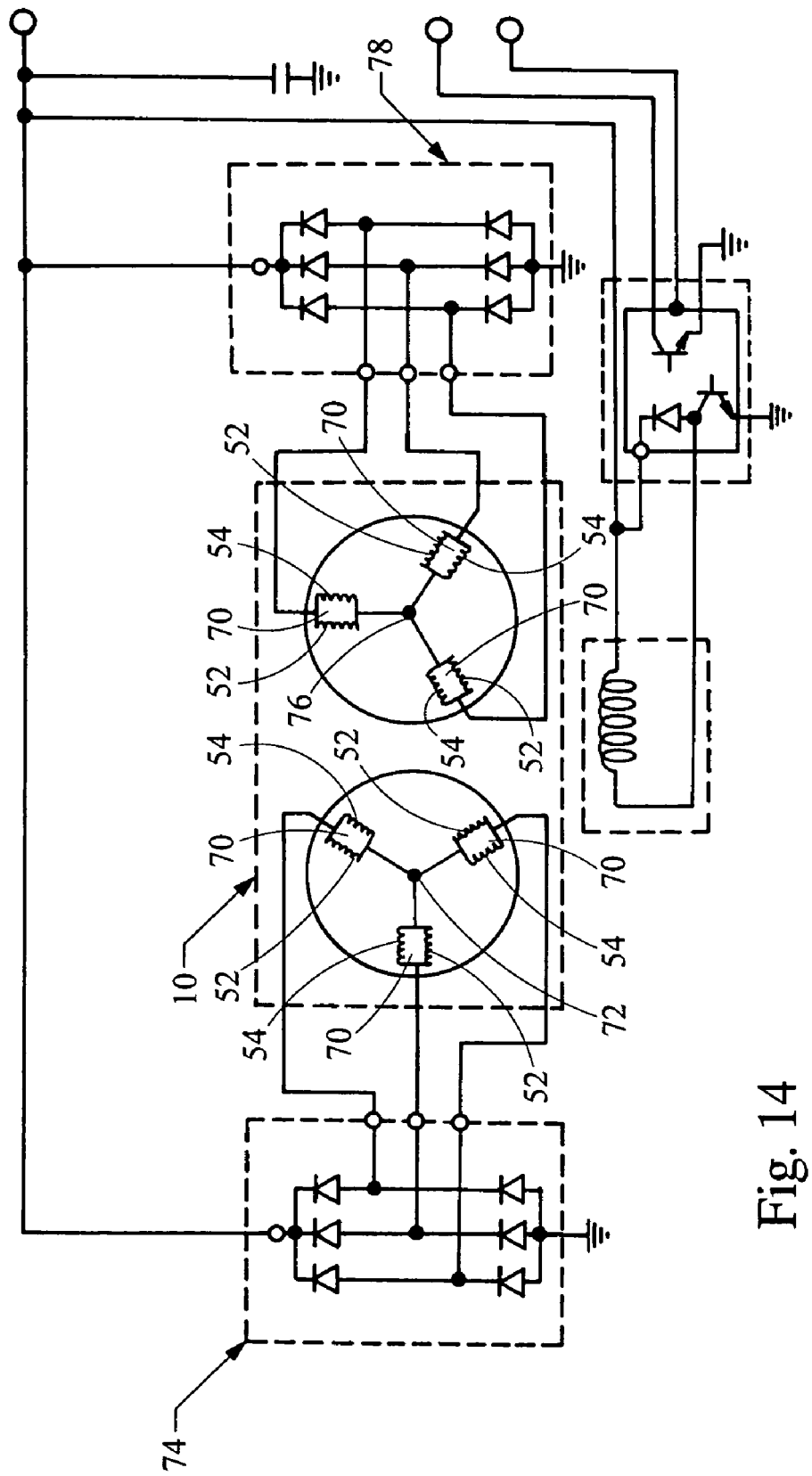
FIG. 14 is a schematic view of an alternator having a stator of the present invention wherein the alternator has two neutral points.

In FIG. 14, the alternator has six phases 70 and two neutral points 72, 76. The first ends 66 of the filars 52, 54 of a first half of the phases 70 are connected to a first neutral point 72 and the second ends 68 of the filars 52, 54 of the first half of the phases 70 are connected to a first rectifier 74. The first ends 66 of the filars 52, 54 of a second half of the phases 70 are connected to a second neutral point 76 and the second ends 68 of the filars 52, 54 of the second half of the phases 70 are connected to a second rectifier 78.

Figure 15:
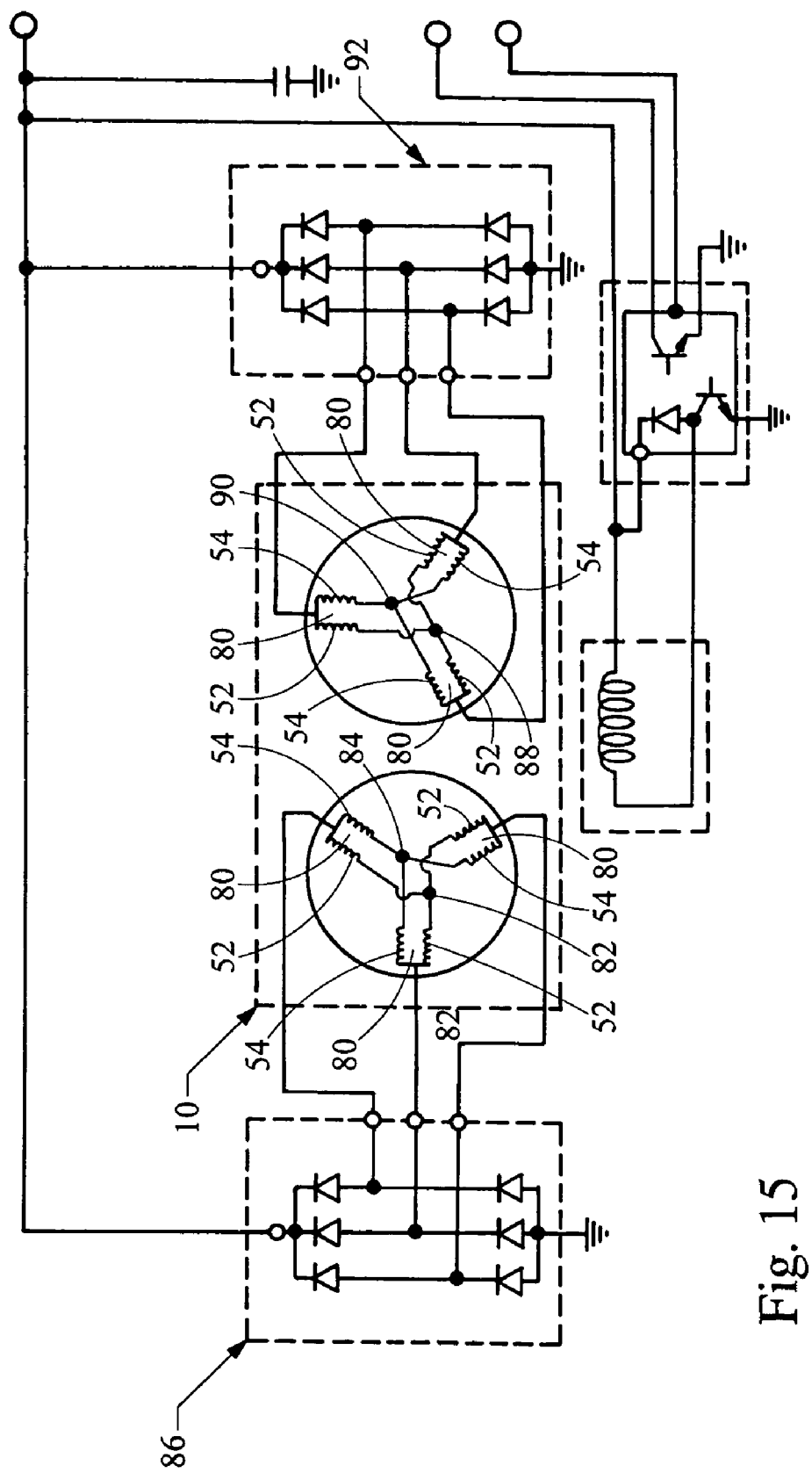
FIG. 15 is a schematic view of an alternator having four neutral points.

In another embodiment, the first ends 66 of the first filars 52 are not connected to the first ends 66 of the second filars 54. The first ends 66 of the first filars 52 are connected to a first neutral point and the first ends 66 of the second filars 54 are connected to a second neutral point. The second ends 68 of the first and second filars 52, 54 are connected to one another and to a rectifier. This dual neutral point connection scheme for each wye advantageously minimizes the cross current circulation problem. If each filar resistance equals R, then the circulation path of the dual neutral point equals 4R (the resistance of filars 54 plus 54 plus 52 plus 52 as seen in FIG. 15) while the circulation path of a single neutral point equals 2R (resistance of filars 54 plus 52 as seen in FIG. 14). Therefore the circulation resistance of the dual neutral point is twice as large as the resistance of the single neutral point. The dual neutral point of FIG. 15, however, has 1.73 times the circulation voltage of the single neutral point because each circulation path has two phases 80 which are of opposite polarity and are phase shifted by 120 degrees.

Therefore, the circulation current of a stator having the dual neutral point connection is 0.865 (1.73 divided by 2) times a stator having the single neutral point connection.

Referring to FIG. 15, an alternator is shown having six phases 80, wherein the first ends 66 of the first filars 52 of a first half of the phases 80 are connected to a first neutral point 82 and the first ends 66 of the second filars 54 of the first half of the phases 80 are connected to a second neutral point 84. The second ends 68 of the first and second filars 52, 54 of the first half of the phases 80 are connected to a first rectifier 86. Similarly, the first ends 66 of the first filars 52 of a second half of the phases 80 are connected to a third neutral point 88 and the first ends 66 of the second filars 54 of the second half of the phases 80 are connected to a fourth neutral point 90. The second ends 68 of the first and second filars 52, 54 of the second half of the phases 80 are connected to a second rectifier 92.

In yet another embodiment, the first end 66 of each of the first filars 52 is connected to one of first and second neutral points and the first end 66 of each of the second filars 54 is connected to the other of said first and second neutral points. In this way, the first ends 66 of the first and second filars 52, 54 for any particular phase are connected to different neutral points. The second ends 68 of the first and second filars 52, 54 of each phase are connected to one another and to a rectifier.

In an alternator of this type, at least one of the first ends 66 of the first filars 52 is connected to one of first and second neutral points and the remaining first ends 66 of the first filars 52 are connected to the other of first and second neutral points. At least one of the first ends 66 of the second filars 54 is connected to one of the first and second neutral points and the remaining first ends 66 of the second filars 54 are connected to the other of the first and second neutral points. This lead connection scheme, best seen in FIG. 16, advantageously further minimizes the cross current circulation problem. This is true because the generated voltage of the first phase 94 now has the same polarity of the generated voltage of the third phase 100 and therefore the resultant cross circulation generated voltage is the addition of the generated voltages of phases 94 and 100. Similarly, the generated voltage of the second phase 98 has the same polarity as the generated voltage of the third phase 100. Having the generated voltages of a cross circulation path in addition, reduces the cross circulation current because the two voltage sine waves are shifted by 120 degrees. The addition of two 120 degree shifted sine waves results in a wave having an amplitude equal to 0.58 times the resultant wave of the subtraction of the same two sine waves.

Figure 16:
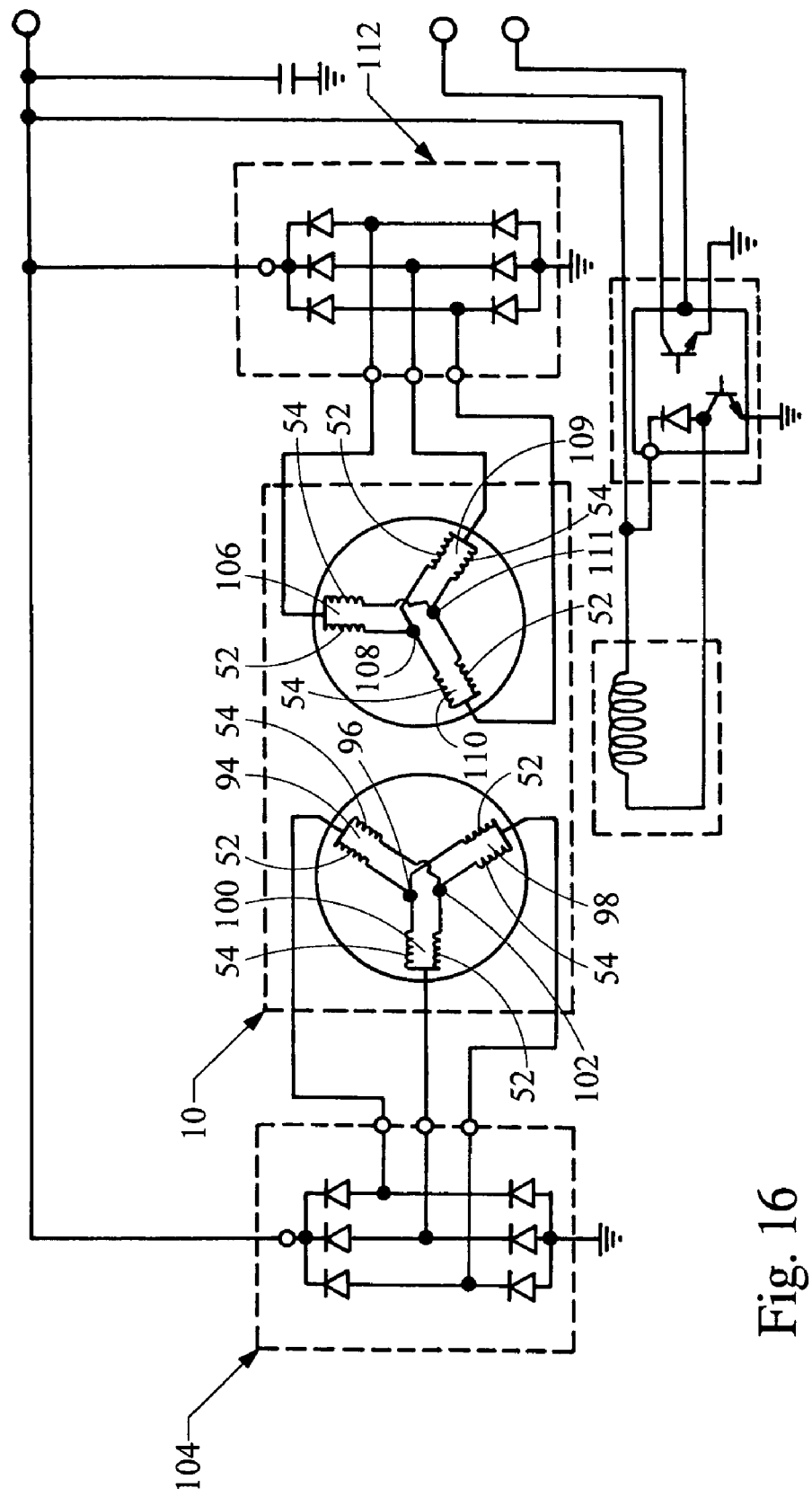
FIG. 16 is a schematic view of an alternate embodiment of the alternator with four neutral points.

More specifically, referring to FIG. 16, in an alternator having six phases, the first ends 66 of the first filars 52 of a first half of the phases are connected to one of first and second neutral points. The first ends 66 of the second filars 54 of the first half of the phases are connected to the other of the first and second neutral points.

In FIG. 16, the first end 66 of the first filar 52 of a first phase 94 is connected to a first neutral point 96. The first ends 66 of the first filars 52 of the second and third phases 98, 100 are connected to a second neutral point 102. The first end 66 of the second filar 54 of the first phase 94 is connected to the second neutral point 102. The first ends 66 of the second filars 54 for the second and third phases 98, 100 are connected to the first neutral point 96. The second ends 68 of the first and second filars 52, 54 of the first, second, and third phases 94, 98, 100 are connected to one another and to a first rectifier 104.

The first end 66 of the first filar 52 of a fourth phase 106 is connected to a third neutral point 108. The first ends 66 of the first filars 52 of the fifth and sixth phases 109, 110 are connected to a fourth neutral point 111. The first end 66 of the second filar 54 of the fourth phase 106 is connected to the fourth neutral point 111. The first ends 66 of the second filars 54 for the fifth and sixth phases 109, 110 are connected to the third neutral point 108. The second ends 68 of the first and second filars 52, 54 of the fourth, fifth, and sixth phases 106, 109, 110 are connected to one another and to a second rectifier 112.

Although the preceding discussion has been centered around a stator having two filars, it is obvious to those skilled in the art that the cross circuit problem may exist with a stator 10 having any number of plurality of filars, such as three or four, connected in parallel. In this case, to minimize the cross current circulation problem it would be desirable for the plurality of filars to have a staggered pattern. Furthermore, it may be desirable to stagger the filars in an alternating pattern. For example, a stator 10 having three filars would be staggered in an alternating pattern such that layer 1 is comprised of a first filar, layer 2 is comprised of a second filar, layer 3 is comprised of a third filar, layer 4 is comprised of the first filar and so forth.

Referring now to FIG. 17, each of the first and second filars 52, 54 is a single continuous conductor having a plurality of substantially straight segments 56 disposed in the core slots 44. The straight segments 56 are alternately connected at the first and second ends 46, 48 of the stator core 42 by a plurality of end loop segments 58. Each of the straight segments 56 of a particular layer are substantially the same radial distance from a central axis 60 of the stator core 42 and the end loop segments 58 form a cascaded winding pattern.

The end loop segment 58 is adapted to be a part of the stator winding 50 and includes a first substantially straight end portion 118 and a second substantially straight end portion 120 that are each proximate to a respective straight segment, discussed in more detail below, of the stator winding 50. The first end portion 118 and the second end portion 120 of the end loop segment 58 are at a same radial distance from the central axis 60 of the stator core 42. The first end portion 118 and the second end portion 120 form a portion of a layer, indicated generally at 122, of the stator winding 50 whose straight segments are in a same radial distance from the central axis 60 of the stator core 42. Although end portions, such as 118 and 120, are described as entities, they may, in fact, just be portions of the substantially straight segments, discussed in more detail below.

The end loop segment 58 includes a first sloped portion 124 and a second sloped portion 126 that meet at an apex portion 128. The first sloped portion 124 is substantially co-radial with the layer 122, the first end portion 118 and the second end portion 120. The second sloped portion 126 is substantially non-co-radial with the layer 122, the first end portion 118 and the second end portion 120. The apex portion 128 includes a first radial extension portion 130. The first radial extension portion 130 extends from the first sloped portion 124 in the radially outward direction, which provides a radial outward adjustment for the end loop segment 58. A second radial extension portion 132 connects the second sloped portion 126 and the second end portion 120. The second radial extension portion 132 extends from the second sloped portion 126 in the radially inward direction, which provides a radial inward adjustment for the end loop segment 58. Although the radial extension portions, such as 130 and 132, shown in FIGS. 17, 18, 19a and 19b appear as sharp bends, it is obvious to those skilled in the art that typical radial extension portions, such as 56 and 58, would be more gentle in nature and include radii, not shown.

While the end loop segment 58 has been shown wherein the radial outward adjustment is adjacent the apex portion 128 and the radial inward adjustment is adjacent the second sloped portion 126, those skilled in the art can appreciate that the radial outward and inward adjustments can be on any one or on any two of the first sloped portion 124, the second sloped portion 126, and the apex portion 128 in order to provide the cascaded winding pattern, described in more detail below.

Referring now to FIG. 18, the end loop segment 58 of FIG. 17 is shown adjacent a plurality of substantially identical end loop segments, indicated generally at 134 and 136. The end loop segments 58, 134, and 136 form a portion of the layer 122 of the stator winding 50. The end loop segments 58, 134, and 136 are shown in a three-phase winding pattern but those skilled in the art will appreciate that the end loop segments 58, 134, and 136 may be formed in, for example, a six-phase winding pattern, or any other winding pattern advantageous for producing electricity or for generating torque, as in the case of an electric motor. The end loop segments 58, 134, and 136 are preferably each disposed at the first end 46 of the stator core 42.

The portion 120 attaches to a first straight segment, shown schematically at 138, which extends through a one of the core slots 44 to the second end 48 of the stator core 42. As the first straight segment 138 exits the second end 48, the first straight segment 138 is attached to an end of another end loop segment, shown schematically at 140, which is described in more detail below. The end loop segment 140 is attached at another end to a second straight segment, shown schematically at 142. The second straight segment 142 extends upwardly through another one of the core slots 44 of the stator core 42 and attaches to a portion 144 of an end loop segment 146, which is substantially identical to the end loop segments 58, 134, and 136. Similarly, a portion 148 of the end loop segment 146 connects to another straight segment, discussed in more detail below. The pattern of connecting end loop segments 58, 140, and 146 and straight segments, such as the straight segments 138 and 142, as outlined above, continues throughout one substantial circumference of the stator core 42 to form a first layer, such as the layer 122, of a single phase of the stator winding 50.

The end loop segment 146 is shown adjacent a plurality of substantially identical end loop segments, indicated generally at 150 and 152. The end loop segments 146, 150, and 152 are each connected to a corresponding plurality of straight segments, discussed in more detail below, such as the straight segments 138 and 142, which are each disposed in a respective core slot 44 of the stator core 42. The straight segments are attached to a plurality of end loop segments, discussed in more detail below. The end loop segments 134, 136, 150, and 152, when attached to the straight segments and end loop segments, each form a respective continuous first layer of the complete stator winding 50 that is wound about the circumference of the stator core 42.

Preferably, each of the straight segments 138 and 142 and each of the end loop segment portions 58, 134, 136, 140, 146, 150, and 152 are formed from a rectangular wire and have a cross-sectional shape having a substantially constant circumferential width and radial width and therefore substantially equal area, however, other shapes could also be employed such as round or square. For those skilled in the art, it is known that typical rectangular or square shaped conductors may include radii on the corners intermediate two adjacent edges.

Figure 19A:
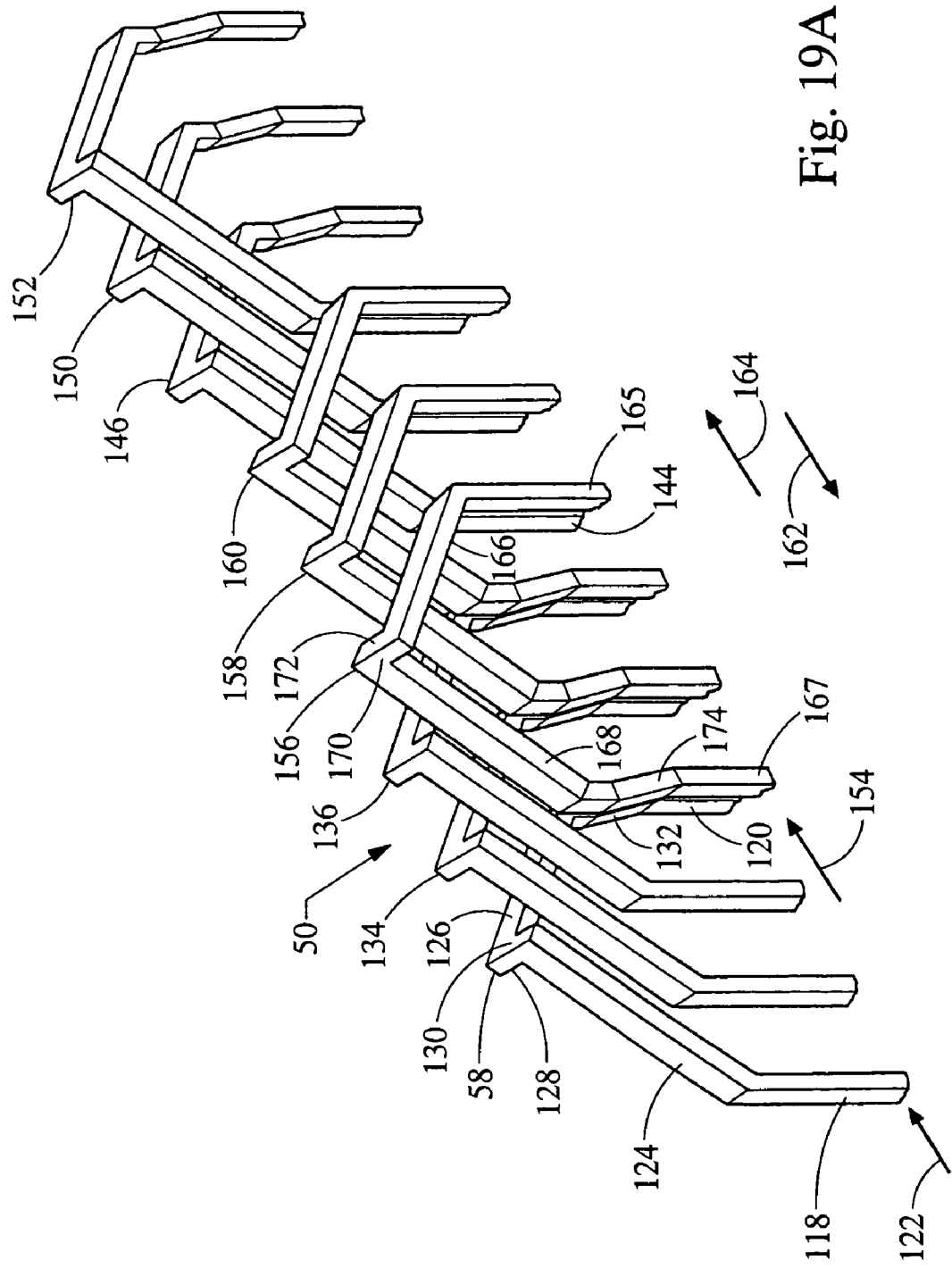
FIG. 19a is a perspective view of a plurality of layers of end loop segments of a stator winding in accordance with the present invention including the layer of FIG. 18.
Figure 19B:
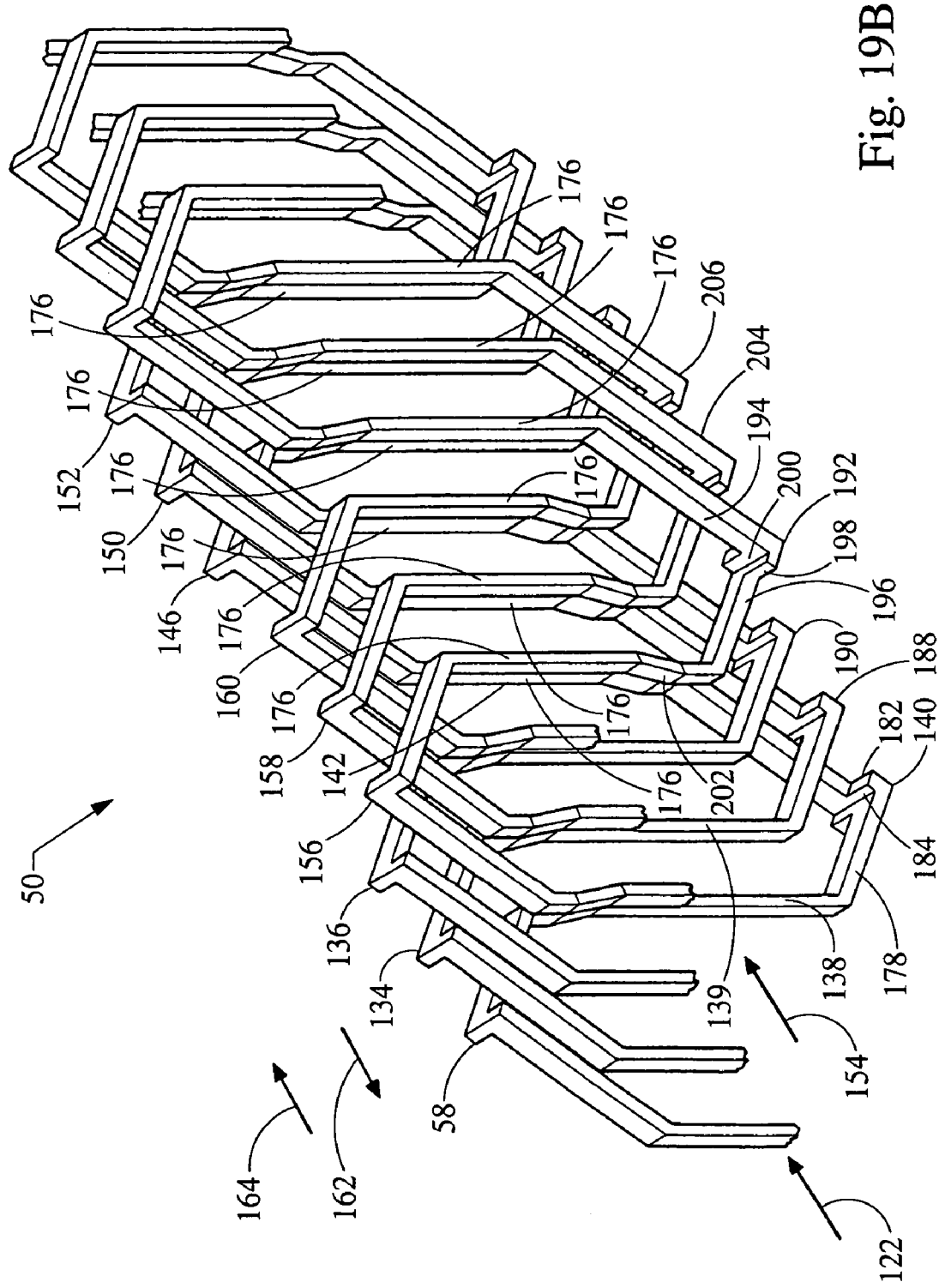
FIG. 19b is a perspective view of a plurality of layers of end loop segments of the stator winding shown in FIG. 19a including a plurality of straight segments and end loop segments in accordance with the present invention.

Referring now to FIGS. 19a and 19b, the first layer 122 of the end loop segments 58, 134, 136, 140, 146, 150, and 152 of FIG. 18, is shown with a second layer of end loop segments indicated generally at 154. The layer 154 is located radially inward of the layer 122 at a predetermined radial distance from the layer 122. The second layer 154 includes a plurality of end loop segments, indicated generally at 156, 158, and 160. The layers 122 and 154 together form a portion of the stator winding, indicated generally at 50. The conductor of the second layer 154 including the end loop 156 is similar to the conductor of the first layer 122 including the end loop 58 except that it is inserted into the core slots 44, shifted by a predetermined number of slots, discussed in more detail below, and it has end loop segments, such as the end loop segment 156, that extend radially outwardly in the counterclockwise direction 162, which is opposite the end loop segments, such as the end loop segment 58, of the first layer 122, which extend radially outwardly in the clockwise direction 164.

The end loop segment 156 includes a first sloped portion 166 and a second sloped portion 168 connected by an apex portion 170. The first sloped portion 166 is substantially co-radial with the second layer 154, the first end portion 165 and the second end portion 167. The second sloped portion 168 is substantially non-co-radial with the second layer 154, the first end portion 165 and the second end portion 167. The apex portion 170 includes a first radial extension portion 172. The first radial extension portion 172 extends from the first sloped portion 166 in the radially outward direction, which provides a radial outward adjustment for the end loop segment 156. A second radial extension portion 174 connects the second sloped portion 168 and the second end portion 167. The second radial extension portion 174 extends from the second sloped portion 168 in the radially inward direction, which provides a radial inward adjustment for the end loop segment 156.

As can best be seen in FIG. 19a, the non-co-radial portion 168 of end loop segment 156 extends radially outward where it becomes substantially co-radial with the first layer 122, the first end portion 118 and the second end portion 120, but because it is shifted by n slots, it does not violate the space of the end loop segments of the first layer 122. This allows the end loop segments of the two layers, 122 and 154 to cascade together forming a two layer winding 50, which extends radially outward by one substantial wire width beyond the first layer 122 but does not extend radially inward beyond the innermost layer 154.

For a winding with a plurality of layers, a third layer (not shown) which is substantially identical to the first layer 122, would have non-co-radial portions that would extend radially outward and be substantially co-radial with the second layer 154 and therefore cascade with the second layer 154. For a pattern where the radial layers alternate between being substantially identical with the first layer 122 and the second layer 154, a pattern develops where the winding 50 only extends radially outward by one wire width for the outermost layer 122 but not radially inward of the innermost layer. This cascading effect allows a winding 50 with a plurality of layers to be inserted into a stator core 42, that extend radially outwardly by one wire width while not extending radially inwardly. The end loop segments 158 and 160 are substantially identical to the end loop segment 156.

The radial outward and inward adjustments for the layers 122, 154 form a cascaded winding pattern shown in FIGS. 19a and 19b.

Referring again to FIG. 19b, the first layer 122 and the second layer 154 are shown with a plurality of straight segments 176, which are substantially identical to the straight segments 138 and 142. The end loop segment 140 of FIG. 18 is shown having a first sloped portion 178 and a second sloped portion 180 connected by an apex portion 182. The first sloped portion 178 is substantially co-radial with the first layer 122, and the straight segments 138 and 142. The second sloped portion 180 is substantially non-co-radial with the first layer 122, and the straight segments 138 and 142. The apex portion 182 includes a first radial extension portion 184. The first radial extension portion 184 extends from the first sloped portion 178 in the radially outward direction, which provides a radial outward adjustment for the end loop segment 140. A second radial extension portion 186 connects the second sloped portion 180 and the straight segment 142. The second radial extension portion 186 extends from the second sloped portion 180 in the radially inward direction, which provides a radial inward adjustment for the end loop segment 140. The end loop segments 188 and 190 are substantially identical to the end loop segment 140.

Similarly, an end loop segment 192 of the second layer 154 is shown adjacent the end loop segment 190 of the first layer 122. The end loop segment 192 includes a first sloped portion 194 and a second sloped portion 196 connected by an apex portion 198. The first sloped portion 194 is substantially co-radial with the second layer 154, and the straight segments 176 of the second layer 154. The second sloped portion 196 is substantially non-co-radial with the second layer 154, and the straight segments 176. The apex portion 198 includes a first radial extension portion 200. The first radial extension portion 200 extends from the first sloped portion 194 in the radially outward direction, which provides a radial outward adjustment for the end loop segment 192. A second radial extension portion 202 connects the second sloped portion 196 and the straight segment 176. The second radial extension portion 202 extends from the second sloped portion 196 in the radially inward direction, which provides a radial inward adjustment for the end loop segment 192. The end loop segments 204 and 206 are substantially identical to the end loop segment 192.

The straight segments 138, 142, and 176 of each phase of the stator winding 50 are preferably disposed in respective core slots 44 at an equal pitch around the circumference of the stator core 42. Specifically, a straight segment of a phase, such as the straight segment 138, is disposed in a respective core slot 44 adjacent a straight segment 139 of the adjacent phase. The respective straight segments 138 and 139 are spaced apart by a circumferential distance or pitch 208, best seen in FIG. 18. The circumferential pitch 208 is substantially equal to the circumferential distance between a pair of adjacent core slots 44 in the stator core 42. Each of the straight segments and end loop segments of the phase including the straight segment 138 remain disposed adjacent the respective straight segments and end loop segments of the phase including the straight segment 139 at the same circumferential pitch 208 throughout the length of the stator winding 50 and throughout the circumference of the stator core 42.

While the straight segments 176 are shown generally coplanar in FIGS. 19a and 19b for illustrative purposes, the straight segments 176 are preferably adapted to be received by a radially curved surface, such as the interior surface of the stator core 42 and, therefore, are not coplanar but are co-radial. The width of each of the straight segments 176, including any insulation, preferably fits closely to the width of the core slots 44, including any insulation.

The foregoing discussion discloses and describes the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

What is claimed is:

1. A stator for an electric machine, comprising:
a generally cylindrically-shaped stator core having a plurality of circumferentially spaced and axially-extending core slots in a surface thereof, said core slots extending between a first and a second end of said stator core; and
a stator winding having a plurality of phases, each phase comprising a first filar and a second filar extending circumferentially around said stator core to form a plurality of layers;
each of said filars having a plurality of substantially straight segments disposed in said core slots, said straight segments alternately connected at said first and second ends of said stator core by a plurality of end loop segments, each of said straight segments of a particular layer being a same radial distance from a central axis of said stator core;
said first and second filars of a particular phase each having an average radial position within said stator core, said first and second filars of each phase being staggered throughout said layers such that a distance between said average radial position of said first filar and said average radial position of said second filar is minimized.

2. The stator of claim 1 wherein said filars have a radial width of and said first and second filars of a particular phase are staggered such that the distance between said average radial positions of said first and second filars of a particular phase is less than 1.75 times said radial width.

3. The stator of claim 2 wherein each of said filars forms four layers within said stator core such that said first and second filars form eight total layers within said stator core.

4. The stator core of claim 3 wherein said first filar and said second filar are staggered such that said first filar occupies first, fourth, fifth, and eighth layers of said stator core and said second filar occupies second, third, sixth, and seventh layers within said stator core.

5. The stator core of claim 3 wherein said first filar and said second filar are staggered such that said first filar occupies first, second, seventh, and eighth layers of said stator core and said second filar occupies third, fourth, fifth and sixth layers within said stator core.

6. The stator core of claim 3 wherein said first filar and said second filar are staggered such that said first filar occupies first, third, sixth, and eighth layers of said stator core and said second filar occupies second, fourth, fifth, and seventh layers within said stator core.

7. The stator core of claim 3 wherein said first filar and said second filar are staggered such that said first filar occupies first, second, sixth, and eighth layers of said stator core and said second filar occupies third, fourth, fifth and seventh layers within said stator core.

8. The stator core of claim 3 wherein said first filar and said second filar are staggered such that said first filar occupies first, third, fifth, and eighth layers of said stator core and said second filar occupies second, fourth, sixth, and seventh layers within said stator core.

9. The stator core of claim 3 wherein said first filar and said second filar are staggered such that said first filar occupies first, third, fifth, and seventh layers of said stator core and said second filar occupies second, fourth, sixth, and eighth layers within said stator core.

10. The stator core of claim 3 wherein said first filar and said second filar are staggered such that said first filar occupies first, third, seventh, and eighth layers of said stator core and said second filar occupies second, fourth, fifth, and sixth layers within said stator core.

11. The stator core of claim 3 wherein said first filar and said second filar are staggered such that said first filar occupies first, third, fifth, and sixth layers of said stator core and said second filar occupies second, fourth, seventh and eighth layers within said stator core.

12. The stator of claim 1 wherein said first filar and said second filar of each phase each include a first end and a second end, said first ends of said first and second filars being connected to one another and said second ends of said first and second filars being connected to one another such that said first and second filars are connected in parallel.

13. The stator of claim 12 wherein said first ends of said first and second filars of each phase are connected to a neutral point and said second ends of said first and second filars of each phase are connected to a rectifier.

14. The stator of claim 12 wherein said first ends of said filars of a first half of said phases are connected to a first neutral point and said second ends of said filars of said first half of said phases are connected to a first rectifier, and said first ends of said filars of a second half of said phases are connected to a second neutral point and said second ends of said filars of said second half of said phases are connected to a second rectifier.

15. The stator of claim 1 wherein said first filar and said second filar of each phase each include a first end and a second end, said first ends of said first filars being connected to a first neutral point and said first ends of said second filars being connected to a second neutral point, said second ends of said first and second filars of each phase being connected to one another and to a rectifier.

16. The stator of claim 1 wherein said first filar and said second filar of each phase each include a first end and a second end, said first ends of said first filars of a first half of said phases are connected to a first neutral point, said first ends of said second filars of said first half of said phases are connected to a second neutral point, said second ends of said first and second filars of said first half of said phases are connected to a first rectifier, said first ends of said first filars of a second half of said phases are connected to a third neutral point, said first ends of said second filars of said second half of said phases are connected to a fourth neutral point, and said second ends of said first and second filars of said second half of said phases are connected to a second rectifier.

17. The stator of claim 1 wherein said first filar and said second filar of each phase each include a first end and a second end, said first end of each of said first filars being connected to one of first and second neutral points and said first end of each of said second filars being connected to the other of said first and second neutral points such that said first ends of said first and second filars for any particular phase are connected to different neutral points, said second ends of said first and second filars of each phase being connected to one another and to rectifier.

18. The stator of claim 17 wherein at least one of said first ends of said first filars is connected to one of said first and second neutral points wherein the remaining first ends of said first filars are connected to the other of said first and second neutral points, and at least one of said first ends of said second filars is connected to one of said first and second neutral points wherein the remaining first ends of said second filars are connected to the other of said first and second neutral points.

19. The stator of claim 1 wherein said first filar and said second filar of each phase each include a first end and a second end, said first ends of said first filars of a first half of said phases are connected to one of first and second neutral points, said first ends of said second filars of said first half of said phases are connected to the other of said first and second neutral points, said second ends of said first and second filars of said first half of said phases are connected to a first rectifier, said first ends of said first filars of a second half of said phases are connected to one of third and fourth neutral points, said first ends of said second filars of said second half of said phases are connected to the other of said third and fourth neutral points, and said second ends of said first and second filars of said second half of said phases are connected to a second rectifier.

20. The stator according to claim 1 wherein said end loop segments of each particular layer include a first sloped portion substantially co-radial with said straight segments of said particular layer and a second sloped portion substantially non-co-radial with said straight segments of said particular layer, said first and second sloped portions connected by an apex portion thereof.

21. The stator according to claim 1 wherein at least one of said end loop segments includes a radial adjustment portion to form a cascaded winding pattern.

22. The stator according to claim 21 including at least two layers for each phase and wherein at least one of said layers is shifted a predetermined number of slots from at least one of another of said layers.

23. The stator according to claim 22 wherein said end loop segments of a one of said layers extend radially outwardly in a counterclockwise direction on said first end of said stator core and said end loop segments of another one of said layers extend radially outwardly in a clockwise direction on said first end of said stator core.

24. The stator according to claim 1 wherein said first filar and said second filar are staggered in an alternating pattern.

25. The stator according to claim 1 wherein for at least one of said phases, one of said layers comprised of said first filar is located radially adjacent to another one of said layers comprised of said first filar.

26. The stator according to claim 1 wherein at least one of said filars of at least one of said phases is formed from one continuous conductor.

27. The stator according to claim 1 wherein the number of said phases is greater than three.

28. The stator according to claim 27 wherein the number of said phases equals six.

29. The stator according to claim 1 wherein a one of said core slots has a minimum circumferential width and said minimum circumferential width is less than 2.6 mm.

30. The stator according to claim 1 wherein said core slots have a rectangular shape and a circumferential width of said core slots is less than 2.6 mm.

31. A stator for an electric machine, comprising:
- a generally cylindrically-shaped stator core having a plurality of circumferentially spaced and axially-extending core slots in a surface thereof, said core slots extending between a first and a second end of said stator core; and
- a stator winding having a plurality of phases, each phase comprising a plurality of filars extending circumferentially around said stator core to form a plurality of layers;
- each of said filars having a plurality of substantially straight segments disposed in said core slots, said straight segments alternately connected at said first and second ends of said stator core by a plurality of end loop segments, each of said straight segments of a particular layer being a same radial distance from a central axis of said stator core; and
- said plurality of filars of a particular phase each having an average radial position within said stator core, said plurality of filars of each phase being staggered throughout said layers such that a distance between said average radial position of said plurality of filars is minimized.

32. A stator for an automotive alternator, comprising:
- a generally cylindrically-shaped stator core having a plurality of circumferentially spaced and axially-extending core slots in a surface thereof, said core slots extending between a first and a second end of said stator core; and
- a stator winding having a plurality of phases, each phase comprising a plurality of filars extending circumferentially around said stator core to form a plurality of layers;
- each of said filars having a plurality of substantially straight segments disposed in said core slots, said straight segments alternately connected at said first and second ends of said stator core by a plurality of end loop segments, each of said straight segments of a particular layer being a same radial distance from a central axis of said stator core;
- said plurality of filars of a particular phase each having an average radial position within said stator core, said plurality of filars of each phase being staggered throughout said layers such that a distance between said average radial position of said plurality of filars is minimized; and
- said at least one of said end loop segments includes a radial adjustment portion to form a cascaded winding pattern.

33. The stator according to claim 32 wherein said first filar and said second filar of at least one of said phases are staggered in an alternating pattern.

34. The stator according to claim 32 wherein for at least one of said phases, one of said layers comprised of said first filar is located radially adjacent to another one of said layers comprised of said first filar.

* * * * *